Jan. 19, 1960
L. R. PEASLEE
2,922,052
SELSYN EXCITER FOR POSITION PROGRAMMING CONTROL SYSTEM
Filed Dec. 10, 1956
3 Sheets-Sheet 1
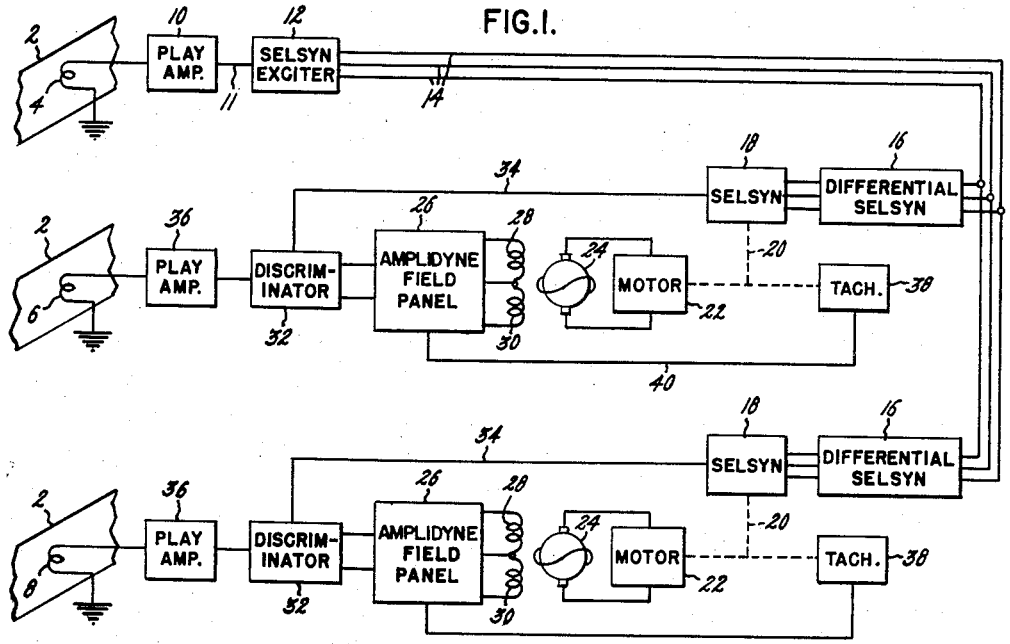
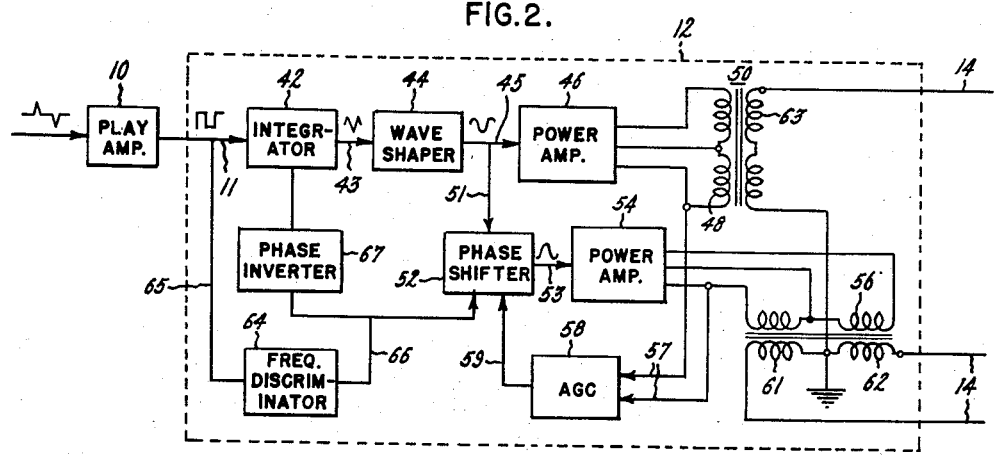
INVENTOR:
LAWRENCE R. PEASLEE,
BY *Melvin M. Goldenberg*
HIS ATTORNEY.

Jan. 19, 1960    L. R. PEASLEE    2,922,052
SELSYN EXCITER FOR POSITION PROGRAMMING CONTROL SYSTEM
Filed Dec. 10, 1956    3 Sheets-Sheet 2

INVENTOR:
LAWRENCE R. PEASLEE,
BY *Melvin M. Goldenberg*
HIS ATTORNEY.

INVENTOR:
LAWRENCE R. PEASLEE,
HIS ATTORNEY.

United States Patent Office 2,922,052
Patented Jan. 19, 1960

1

2,922,052

SELSYN EXCITER FOR POSITION PROGRAMMING CONTROL SYSTEM

Lawrence R. Peaslee, Waynesboro, Va., assignor to General Electric Company, a corporation of New York Application December 10, 1956, Serial No. 627,311

13 Claims. (Cl. 307—149)

This invention relates generally to improvements in control systems in which information for the direction of a program or sequence of operations involving qualities such as time, position, number and speed are directed from a pattern representative of this information stored in data storage devices. More specifically, this invention relates to improvements in a means for developing reference signals to be supplied to the indicating devices attached to the device which is reproducing the program so that a continuous comparison with recorded program can be effected in order to insure accuracy.

In controlled programming systems, the usual practice is to develop a program using any one of several techniques and to store the developed program, or rather information representative of the developed program, in some kind of suitable data storage device such as punched cards, punched tape and magnetic tape. When it is desired to reproduce the program, the information is obtained from the data storage device and a series of signals representative of the program to be reproduced are developed therefrom. These signals are fed to means which may in themselves position the device or devices carrying out the program or which may serve only to indicate the position, velocity and time of various components of the device. In one form of such control systems, information including a reference pattern and as many other patterns as are necessary for directing various components of the device carrying out the program are stored on a multi-channel magnetic tape. The information in a control system of this character may be in the form of alternating magnetization patterns, and each activity to be directed can be represented by a separate pattern or channel having a varying phase or frequency relationship with a pattern appearing in a reference channel.

In order to obtain the information for such a control system, several approaches may be utilized. One method may involve the use of a source of reference signals and recording the output therefrom. The pattern for each channel may be obtained by recording the output of suitable signal generators such as selsyns driven by components of the device actually carrying out the program. Alternatively, it is possible to obtain the information from a digital computer by processing the output thereof in a suitable digital to analogue converter and recording this latter output on a multi-channel tape.

One application of such a system is shown in the patent to Livingston et al., 2,537,770, and in my co-pending application Serial Number 555,967 filed December 28, 1955, both assigned to the same assignee as this application, wherein it is used to control the operations of a machine tool. In both the application and the patent, the complete system envisions the usage of a reference pattern and a plurality of control alternating patterns recorded on a magnetic tape. In the playback operation, the reference pattern produces a reference alternating voltage and each control pattern produces a control alternating voltage having a varying phase or time relationship to the reference voltage which was determined when the program was recorded. The phase relationship of the control voltages are compared with phase relationships of corresponding voltages produced by selsyns coupled to the machine tool and energized by the reference voltage. Any difference in this phase relationship from that indicating correct positioning of a controlled element represents an error between the correct position and the actual position. A means is provided to respond to such difference in phase to produce an error voltage which is utilized to effect a correction in the position of the controlled element.

In both the patent to Livingston et al., and my co-pending application, it was contemplated that the selsyns driven by the controlled elements would be electrically supplied by the output of a selsyn exciter. Such supply takes the form of either two-phase or three-phase alternating signals having a constant phase and amplitude relationship to each other. My co-pending application contemplates a selsyn exciter having means for synchronizing its output with the reference channel in order that the phase relationships of the selsyn outputs and the control channel outputs are properly related to the phase relationships of the reference channel patterns and the control channel patterns. In order to achieve the same results, it is an object of this invention to provide an improved selsyn exciter providing a two or three-phase output using wave-shaping techniques.

It is a further object of this invention to provide a means for developing reference signals for use in a program control playback system wherein the need for extension synchronization of the reference signal developing means with a reference channel on the data storage medium is eliminated.

It is a still further object of this device to provide a novel means for developing a plurality of alternating electrical signals having a constant phase relationship from a single reference signal.

It is another object of this invention to provide a novel means for developing either two or three-phase reference signals wherein the phase relationships are accurately maintained and the amplitude of the reference signals exhibit a constant relationship.

In accordance with the objects of my invention, I provide in one embodiment thereof a means for deriving a square-wave alternating electrical signal from a reference signal stored on a data storage medium and a means for integrating the square-wave signal. A wave-shaping means is provided to form the integrated square wave into substantially sinusoidal electrical signals. Also provided are at least two outputs coupled to the wave-shaping means so that at least two alternating sinusoidal signals having a constant phase relationship may be derived.

The subject matter which I regard as my invention is particularly pointed out and distinctly claimed in the concluding portion of this specification. My invention, however, both as to its organization and method of operation together with further objects and advantages thereof, may best be understood by reference to the following description taken in connection with the accompanying drawing in which:

Figure 1 is a schematic block diagram of an embodiment of the invention in a programming control system;

Figure 2 is a schematic block diagram of an improved selsyn exciter embodying my invention;

Figure 3:
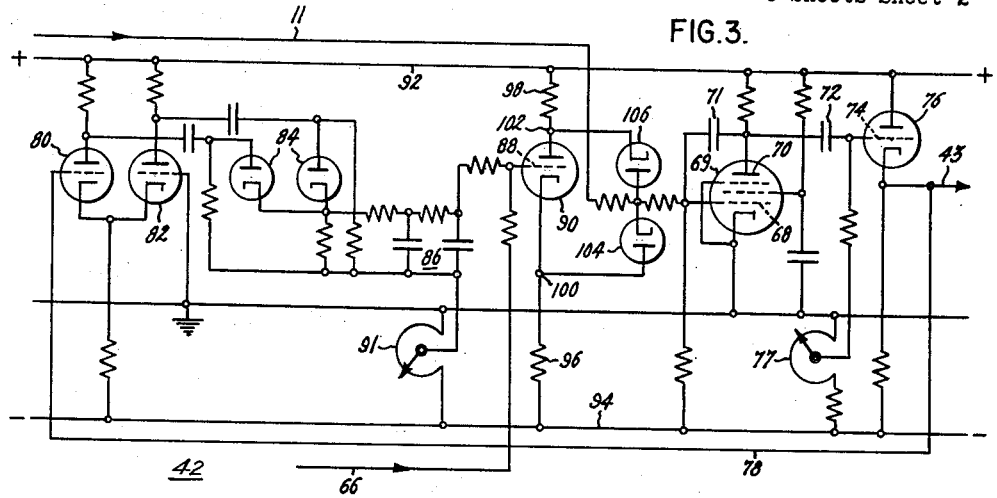
Figure 3 is an elementary diagram of an integrator which is a component of this invention.

Referring now to Figure 1 of the drawing, I show a playback record system incorporating my invention. The playback record system has application in any control device wherein it is desired to reproduce a program stored on a data storage medium and to direct the motion or other activity of a device to be controlled thereby. The activities controlled may be of any number and may involve time, position, number and direction. In the embodiment shown, the signals representative of the program are shown as being recorded in a section of magnetic tape 2. The showing is schematic and for the purposes of illustration only, for it may be that the signals controlling the program may be derived directly from a computer. That is to say, it may be that the information may be prepared and stored in the form of digital information and a converter used to convert the information to signals with a phase relationship having an analogue in the motions of the device to be controlled. In such a situation, the invention will derive the phase analogue information and carry out its comparisons in the manner to be described in detail below. On the other hand, it may be that the information stored is already in the nature of phase analogue information in the manner described in the patent to Livingston et al., supra. It should also be pointed out that the illustration of the magnetic tape 2 is figurative and, in fact, constitutes or may constitute a single tape having a plurality of channels thereon directing the various motions of the device. It is also to be understood in regard to this figure that the number of channels shown is merely illustrative, for as many channels may be provided as it is desired motions to be controlled, and the two illustrated channels are not to be considered limitative.

In accordance with this embodiment of my invention, I provide in this system a storage medium 2 having a programmed series of operations recorded thereon. The storage medium in this instance is a magnetic tape and the signal is developed therefrom by the use of a suitable pick-up head 4 in a first channel. The first channel is used to derive a suitable reference signal which is supplied to the transducers associated with the device reproducing the program and whose output is continuously compared with the program on a second channel 6 and a third channel 8.

The reference channel includes a playback amplifier 10 whose output is coupled via the conductor 11 to the selsyn exciter 12. It is contemplated that the output of the reference channel will comprise a single alternating signal. Selsyn exciter 12 develops from this signal, in accordance with my invention as will be described in greater detail hereinafter, a two or three-phase alternating signal which is fed via the conductors 14 to the selsyns of the different activity channels. Since each activity channel is identical, they have been given the same reference numerals and only one will be described. The three-phase signal is first coupled to a differential selsyn 16 which in turn is coupled to a selsyn 18. The selsyn 18 is mechanically connected as indicated by the dotted line 20 to a motor 22 which drives an element to be positioned in accordance with the control signal directing the channel. It should be understood that it may be found desirable to couple it to any controlled machine member. The motor control is furnished by an amplidyne 24 or other power amplifier which in turn is controlled by the output from an amplidyne field panel 26 having two windings 28 and 30, each winding functioning to control the amplidyne 24 in a forward and reverse direction respectively. The amplidyne field panel receives signals from a discriminator 32 which is carrying out a comparison between signals derived via the conductor 34 from the selsyn 18 and signals received from the recorded control channel via the pick-up head 6 and a play amplifier 36.

The differential selsyns 16 are provided in order to enable initial adjustments of the device being programmed to be made and to compensate for fixed phase errors in the complete system. Also provided is a tachometer generator 38, the output of which is coupled to an amplifier in the amplidyne field panel 26 by the conductor 40 to provide a velocity stabilizing signal. The functions and structure of the differential selsyns 16, discriminator 32, amplidyne field panel 26 and tachometer generator 38 are described in my co-pending application and reference may be had thereto for a more detailed explanation of these components.

The operation of this embodiment of the invention is essentially that described in the Livingston et al. patent and in my co-pending application referred to above, however, I will briefly review the mode of operation. In determining the program, the reference signal and signals representative of the position and velocity of each motion to be programmed may be obtained using the techniques disclosed in the Livingston patent and in my co-pending application. When it is desired to reproduce the program, the reference signal is formed by the selsyn exciter 12 into an alternating electrical signal of two or three sine waves having a constant phase relationship. These signals are supplied to the differential selsyn 16 and selsyn 18, and the output of the selsyn 18 is therefore a sine wave having a phase relationship with the reference signal indicative of the position and motion of the machine in relationship to the reference wave. The recorded motion program signal is derived from the pick-up heads 6 or 8 and is amplified by the playback amplifier 36 and supplied to the discriminator 32 along with the output of the selsyn 18. The discriminator 32 compares the phase relationship of these two waves and supplies an error signal to the amplidyne field panel accordingly to direct the motion of the motor 22 through the amplidyne 24. This technique is used for each one of the channels involved.

Referring now to Figure 2 of the drawing, in accordance with my invention I provide a novel selsyn exciter 12. In this form of my invention, the output of the playback amplifier 10, which may take the form of the similar device described in my co-pending application, is fed via conductor 11 to an integrator 42. The output of the playback amplifier 10 is a square-wave alternating signal formed by a bi-stable device such as a multi-vibrator. The integrator develops a triangular wave therefrom and couples it via the conductor 43 to a wave shaper 44. The wave shaper 44 forms the triangular or integrated square wave into a substantially sinusoidal wave. Also provided, in order to derive reference signals for a selsyn system, are a plurality of outputs from which two-phase or three-phase waves may be taken. This derivation is accomplished by coupling the output of the wave shaper 44 to a power amplifier 46 via the conductor 45. The power amplifier 46 develops a push-pull output in accordance with my disclosure in my co-pending application. This push-pull output is fed to the primary 48 of a Scott T-connected transformer 50. In order to develop the other sine waves having a constant phase relationship to the first one, a portion of the output of the wave shaper 44 is fed via the conductor 51 to a phase-shifting network or integrator 52. Thus, if the output of the wave shaper 44 is substantially a sine wave, the phase shifter 52 will develop a wave displaced 90° therefrom and couple it via conductor 53 to a second power amplifier 54. The second power amplifier 54 also includes a push-pull output stage which is coupled to the second primary 56 of the Scott T-connected transformer 50.

In order to insure that a predetermined amplitude relationship between the sine and the 90° displaced (or cosine) wave is maintained, an automatic gain control circuit is provided by means of the conductors 57 coupled to the outputs of the power amplifiers 46 and 54. An automatic gain control device 58 compares the amplitudes of these two signals and furnishes a corrective signal over the conductor 59 to the phase shifter 52 in order to maintain the predetermined amplitude relationship. The three-phase output is derived by the conductors 14 from the secondary windings 61, 62 and 63.

If it is desired to vary the speed of the storage medium for any purpose, gain control in such a situation is improved by the use of a frequency discriminator 64 which develops a control signal proportional to the frequency of the reference signal from the conductor 65 and couples it to the integrator 42 over the conductor 66 and a phase inverter 67 and also to the phase shifter 52 via the conductor 66 in a manner to be described in greater detail hereinafter.

Some elements of this invention are disclosed in my co-pending application Serial Number 555,967. That is, the playback amplifiers 10 and 36, discriminator 32, amplidyne field panel 26 and power amplifiers 46 and 54 are described in detail in that application and these descriptions will not be repeated here.

Referring to Figure 3 of the drawing, I show a means to integrate the output of the playback amplifier 10, which output is in the form of a square-wave alternating signal. This output is coupled via the conductor 11 to the grid 68 of a pentode 69. Negative feedback is provided between the plate 70 and the grid 68 of this tube by means of a capacitive connection 71. Since the grid 68 of the tube 70 cannot switch rapidly from maximum negative to maximum positive signal by virtue of the long time constant determined by the capacitor 71 and the grid to ground resistance, when this portion of the square-wave signal is applied to the grid the voltage goes positive at a substantially linear rate until the square wave switches from maximum positive to maximum negative. The time constant again determines the rate at which the grid changes potential and this again is substantially a linear rate of change. Thus, the output of the tube 69 is a triangular wave and this is coupled via the capacitor 72 to the grid 74 of the triode amplifier 76 which is connected as a cathode follower to the output 43. A balancing potentiometer 77 is provided to set the D.C. level of the tube 76 and, therefore, the output 43.

In order to control the height of the input square wave, a portion of the output is taken via the conductor 78 and fed to the triodes 80 and 82, which have a common cathode connection to produce a push-pull output. The output of each of these tubes is coupled to the full-wave rectifier 84. The output of the rectifier is filtered by the network 86 and supplied to the grid 88 of an electron discharge device 90. The operating level of the tube 90 is determined by the setting of the potentiometer 91 which is connected between a source of negative potential and the ground. Electron discharge device 90 is provided in a path between points of opposite potential 92 and 94, which path includes the resistors 96 and 98. Thus, points of reference potential are established at 100 and 102 in this path wherein the point 100 is at some negative value and the point 102 at some positive value. A pair of diodes 104 and 106 each have one electrode connected to the conductor 11 and the other electrode of each is connected to the points 100 and 102 respectively. Since the potential values at 100 and 102 are determined by the conduction in the tube 90 and, therefore, the bias on the grid 88 thereof, as this bias varies so will the values of the potentials at 100 and 102. These potentials in turn are centered about the zero or ground connection as may be seen in the drawing, and since diode 104 will conduct when the negative going portion of the square wave is more negative than the negative potential at 100 and the diode 106 conducts in a similar manner for the positive going portion, the square wave can never exceed the potentials at points 102 or 100.

Thus, if there should be some change in the circuit on the square wave so that the height or the frequency of the input square wave changes, then the height of the triangular wave consequently tends to change. If, for example, the amplitude tends to increase, an increased amplitude signal appears at the grid 74. This increased amplitude signal is applied to the phase inverter 80 and rectified and applied to the grid 88 of the electron discharge device 90. The positive bias applied to this grid causes the points 100 and 102 to move closer together and in this manner, the diodes 104 and 106 act to limit the height of the square wave.

If the frequency of the incoming square wave varies over a wide range, it may be desirable to utilize a frequency discriminator 64 as shown in Figure 2. This frequency discriminator may be constructed in the same manner as shown in my co-pending application, Serial Number 555,967, and provides an error signal in response to a change in frequency such as an increase. Since the output of the frequency discriminator in my co-pending application goes positive with increasing frequency, the phase inverter 67 is furnished to derive a negative counterpart which is applied to the grid of the electron discharge device 90. The positive error signal is coupled via the conductor 66 to the phase shifter 52 to provide a correction as described in detil hereinafter.

Figure 4:
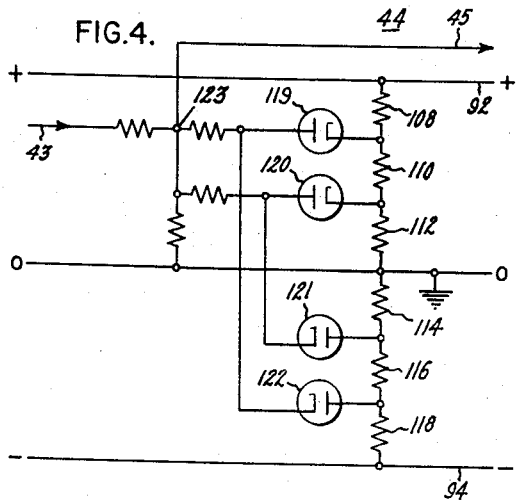
Figure 4 is an elementary diagram of a wave-shaping device usable in my invention.

In order to form the triangular wave output of cathode follower 76 of the integrator 42 into a substantially sinusoidal wave, a wave-shaping circuit is provided as shown in Figure 4. The output is coupled via the conductor 43 to a network of diodes 119, 120, 121, 122 connected across a voltage divider constituted by the resistors 108, 110, 112, 114, 116 and 118 connected between points of opposite electrical potential 92 and 94. The center of the voltage divider is tied to point of zero or ground potential. The diodes 119 and 120 are connected with their cathodes coupled to the voltage divider on that portion of the voltage divider extending to the point of positive potential while the diodes 121 and 122 are coupled to the voltage divider on that portion extending from ground to the point of negative potential. Thus, when the positive going portion of the triangular pulse arrives at the point 123, the voltage at this point will increase until it exceeds the positive potential on the cathode of 120. At this point, the diode 120 will conduct and the rate of increase of the voltage at point 123 will decrease. The voltage then will increase at this new rate until the voltage on the cathode of diode 119 is exceeded, at which point this diode will conduct and the voltage will increase at a still further reduced rate. After positive peak is reached, voltage begins to decrease at rates corresponding to increasing rates until zero is reached. Upon the arrival of a negative going portion of the triangular pulse, the diodes 121 and 122 will function in the same manner. By this means, a substantially sinusoidal wave will be derived over the output conductor 45 of the wave shaper 44. The number of diodes shown in this circut 4 is for purposes of illustration only. Obviously, as many diodes may be provided as it is desired to more closely approximate the shape of a sinusoidal wave. It has been found that on the order of three or four diodes connected on each side the point of ground or reference potential will provide a very good approximation.

Referring again to Figure 2 of the drawing, it is seen that the sinusoidal output via the conductor 45 is supplied to the power amplifier 46. This power amplifier functions in conjunction with the Scott T-connected transformer 50 in the manner described in my co-pending application, Serial Number 555,967. In order to derive a second signal having a 90° phase relationship to the signal applied to the power amplifier 46, a portion of the output of the wave shaper 44 is taken via the conductor 51 and applied to the phase shifter or integrator 52. The details of this portion of my invention are shown in Figure 5 and I will now refer to that figure.

For the purpose of this explanation, the signal coupled to the phase shifter 52 may be characterized as a sine wave. This signal is applied to the grid 124 of the electron discharge device 125. A capacitor 126 provides negative feedback between the plate 127 and grid 124 of this tube. The output of the electron discharge device 125 is a co-sine wave and this in turn is coupled via the capacitor 128 to the grid of the variable mu tube 132. After amplification in this tube, the signal is applied by capacitor 134 to the triode amplifier 136, from which the conductor 53 derives an output consisting of a co-sine wave or a wave 90° out of phase with that supplied to the power amplifier 46.

In order that the three-phase output may be derived, this co-sine wave is supplied to the second power amplifier 54, Figure 2, which provides an input to the primary 56 of the Scott T-connected transformer in the manner described in my co-pending application.

Figure 5:
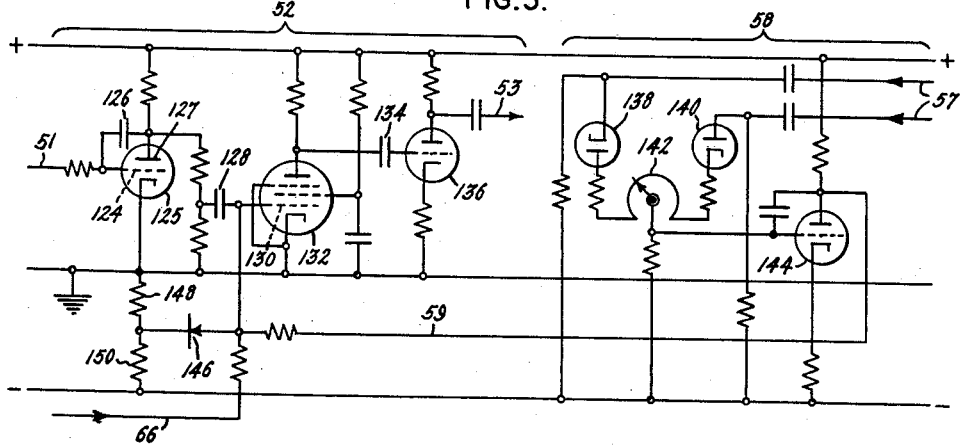
Figure 5 is an elementary diagram of a phase-shifting network usable in my invention.

In order to maintain the amplitudes of the sine and co-sine waves being fed to the power amplifiers 46 and 54 at a predetermined amplitude relationship, portions of the outputs of these amplifiers are coupled by the conductors 57 to an automatic gain control device 58 and the output thereof fed to the phase shifter or integrator 52, Figure 5, to regulate the amplitude of the output of this unit. These signals consisting of two sine waves 180° out of phase are supplied to a pair of rectifiers such as diodes 138 and 140. Each diode rectifies the signal applied thereto and when the rectified voltage exceeds, either in a positive or negative sense, a predetermined ratio as determined by the setting of a potentiometer 142, it is fed to A.G.C. amplifying device 144. This voltage is in turn applied via the conductor 59 to the grid of the variable mu tube 132 to vary the gain thereof. A network consisting of the unilateral conducting device 146 and constituted by resistors 148 and 150 function to prevent the A.G.C. signal from becoming excessively positive and thereby preventing positive feedback in the tube 132.

Thus, it may be seen that in accordance with my invention I provide a means for deriving a series of reference signals from information stored on a data storage medium relating to a program to be controlled. Sine wave alternating signals are developed from the reference signals to provide an input for either a two-phase or three-phase position indicating system so that the program may be accurately reproduced. This is accomplished by the use of a system which does not require extensive synchronization with the frequency of signals from the data storage device except in those situations where this frequency may vary over a wide range as desired by the requirements of the user and, in which case a frequency discriminator is provided to permit synchronization over such a wide range.

Figure 6:
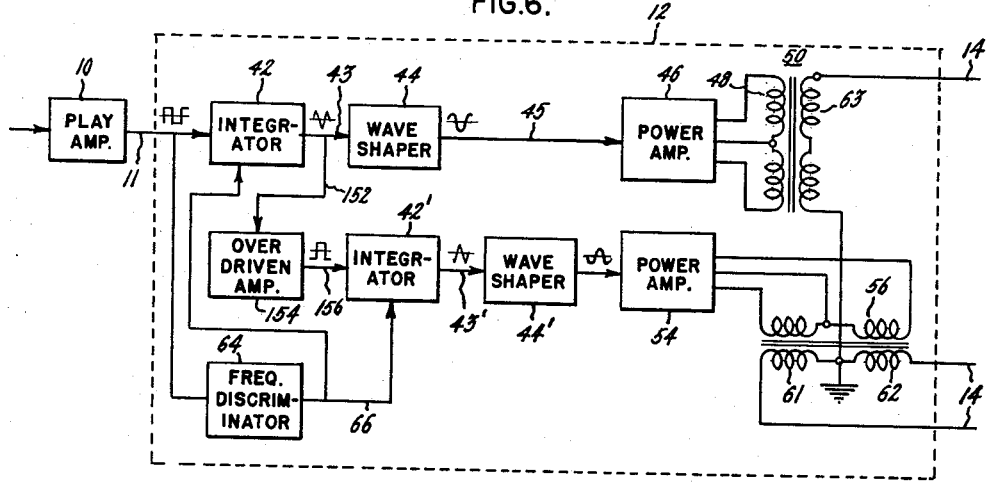
Figure 6 is a schematic block diagram of a second embodiment of my invention.
Figure 7:
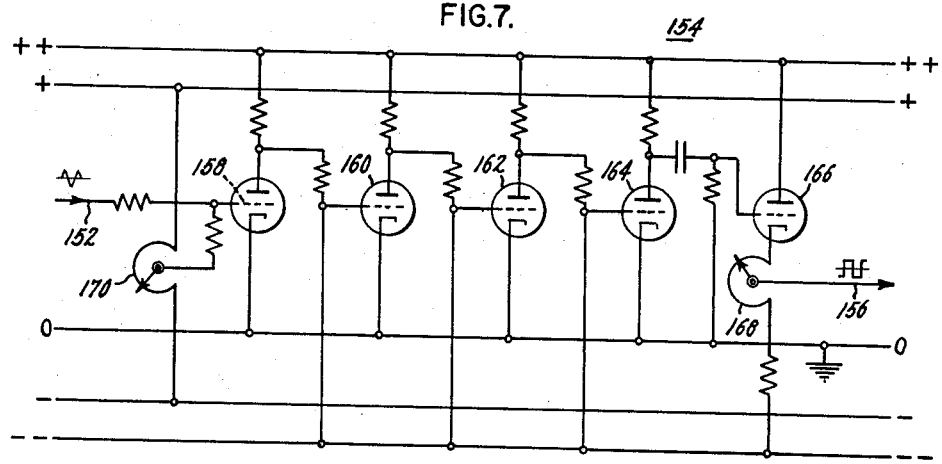
Figure 7 is an elementary diagram of an over-driven amplifier suitable for use in my invention.

In Figures 6 and 7, I show a second form of my invention. In Figure 6, those portions of my invention which correspond to the embodiment of Figure 2 have been given the same reference numeral and the description of those parts will not be repeated here. In this form of my invention, the signal which is developed into the sine wave is derived from the output of the integrator 42 by a conductor 152 and coupled to an over-driven amplifier 154. The output of this amplifier is a square wave which is applied by conductor 156 to an integrator 42' and wave shaper 44'. The integrator 42' and wave shaper 44' may have the same form as those described for the integrator 42 and wave shaper 44 above. The output, therefore, of the wave shaper 44' is a wave 90° out of phase with the output of the wave shaper 44. This output in turn is coupled to similar power amplifier 54 to derive either a two-phase or three-phase output for a positioning indicating system such as a selsyn.

Figure 7 of the drawing discloses an over-driven amplifier 154 suitable for use in the form of my invention shown in Figure 6. Suitable biases are provided on four direct coupled amplifiers 158, 160, 162 and 164 in order to amplify and limit the triangular wave input to this device. The cathode follower 166 is provided for impedance matching purposes. A control potentiometer 168 is provided so that the D.C. level may be adjusted to zero volts output. A bias control potentiometer 170 is provided to determine the conduction level of tube 158.

My invention is capable of assuming still different forms. Thus, if desired, in recording the reference channel it is possible to record two separate channels of signals, one 90° out of phase with the other and to provide separate channels in the selsyn exciter for each signal. Each separate channel would have its own integrator and wave shapers. It is also possible to use my invention in a system wherein a reference channel and one or more control channels are recorded and utilized in conjunction with single phase and three synchronous motors with all of the motors geared together through a mechanical differential system and one of the motors functions to establish a reference.

Both forms of my invention are provided for use in a playback record system wherein it is desired to repeat a program previously recorded. It should be understood that a system incorporating my invention need not be located in close physical proximity to the source of reference and control signals as they may be derived from a receiver in a telemetering system. The system has application in a large number of situations regardless of how the program is obtained.

Although in accordance with the provisions of the patent statutes this invention is described as embodied in concrete form and the principle thereof has been explained together with the best mode in which it is now contemplated applying that principle, it will be understood that the elements shown and described are merely illustrative and that the invention is not limited thereto since alterations and modifications will readily suggest themselves to persons skilled in the art without departing from the true spirit of this invention or from the scope of the annexed claims.

What I claim as new and desire to secure by Letters Patent of the United States is:

1. A device for developing a plurality of alternating electrical signals from a single source, said plurality of alternating electrical signals having similar electrical qualities and a predetermined phase relationship with each other comprising means for developing square-wave signals from said source signals, means coupled to said developing means for integrating said square-wave signals, wave-shaping means coupled to said integrating means for forming said integrated signals into the desired signals, and means including a phase shift device and a transformer coupled to said wave-shaping means for deriving at least two output signals having said predetermined phase relationship with each other.

2. A device for developing a plurality of alternating current electrical signals having similar electrical qualities and a predetermined phase relationship with each other comprising a source of reference signals, means coupled to said source for forming substantially rectangular wave signals from said reference signals, means coupled to said forming means for integrating said rectangular wave signals, wave-shaping means coupled to said integrating means for forming first substantially sinusoidal wave signals from said integrated signals, phase shifting means coupled to said wave-shaping means for producing second substantially sinusoidal wave signals having a shifted phase with relation to the phase of said first wave signals produced by said wave-shaping means, and transformer means coupled to said phase shifting means and to said wave-shaping means for producing two output alternating current electrical signals therefrom, said output signals having said predetermined phase relationship and similar electrical qualities.

3. In a programming control system in which a reference control pattern has been stored on a data storage medium, the combination of first means coupled to said storage medium for deriving reference electrical signals therefrom to synchronize a device that reproduces said pattern, second means coupled to said first means for producing rectangular wave alternating current electrical signals in response to said reference electrical signals, third means coupled to said rectangular wave developing means for integrating said rectangular wave electrical signals, fourth means coupled to said third means for producing first substantially sinusoidal alternating current electrical signals from said integrated signals, additional circuit means coupled to the path formed by said first means, said second means, said third means, and said fourth means for producing second substantially sinusoidal alternating current electrical signals, and transformer means coupled to said additional circuit means and to said fourth means for deriving at least two output electrical signals therefrom.

4. In a programming control system in which a reference control pattern has been stored on a data storage medium, means for deriving reference electrical signals from said reference control pattern, a first signal translating stage for developing square-wave alternating electrical signals from said reference electrical signals, means for integrating said square-wave alternating signals, wave-shaping means for forming said integrated signals into substantially sinusoidal alternating electrical signals, means for deriving at least two output signals having a constant phase relationship from said wave-shaping means, and means for coupling said at least two output signals to object position indicating devices on a device carrying out the program.

5. In a programming control system in which a reference control pattern is stored on a data storage medium, means for deriving reference electrical signals from said reference control pattern, means for amplifying said reference signals, means for forming said amplified reference electrical signals into square-wave alternating signals, means for controlling the amplitude of said square-wave alternating signals, means for integrating said square-wave signals, means including a plurality of unilateral conducting devices providing paths to ground for successive portions of said integrated square-wave alternating signal for forming substantially sinusoidal alternating signals from said integrated signals, and output means coupled to said last-mentioned means for deriving at least two outputs having a constant phase relationship from said last-mentioned means.

6. In a programming control system in which a reference control pattern is stored on a data storage meduim, means for deriving reference electrical signals from said reference control pattern, bistable means for developing a square wave from said reference signals, means for integrating said square-wave alternating signals, means responsive to variations in the amplitude of said integrated electrical square-wave alternating signals to hold the amplitude of said square-wave signals at predetermined levels, wave-shaping means for forming said integrated electrical signals into substantially sinusoidal electrical signals, and means for deriving at least two outputs from said wave-shaping means having a constant phase relationship.

7. A device as described in claim 6 wherein said means responsive to the amplitude of said integrated signal includes a pair of oppositely poled rectifying devices providing conducting paths for said square-wave signal when said wave signals have an amplitude exceeding a predetermined amount, and wherein an electron discharge device is provided in said conducting path to determine the conduction level of said diodes.

8. An automatic gain control circuit comprising a source of voltage to be regulated, means for deriving a signal proportional to the amplitude of said voltage, means for amplifying and rectifying said proportional signal an electron discharge device the conduction of which is responsive to said rectified signal, said electron discharge device being disposed in a path coupled between potentials of opposite polarity, a pair of oppositely poled unilateral conducting devices coupled adjacent the plate and the cathode of said electron discharge device and to said source of voltage to be regulated whereby the voltage to be regulated is held to a maximum as determined by the conduction of said electron discharge device.

9. A device for developing at least two sinusoidal electrical signals from a source of reference signals comprising, means for developing a square-wave alternating signal from the reference signals, automatic gain control means for controlling the amplitude of said square-wave signals, means for integrating said square-wave signals, means for deriving a signal proportional to the amplitude of said integrating square-wave signals, means for amplifying and rectifying said proportional signal, a conducting path connecting points of opposite potential, an electron discharge device interposed in said conducting path, a pair of oppositely poled diodes each diode having one electrode coupled to said integrating means, and another electrode coupled to said conducting path on opposite sides of said electron discharge device, and means for applying said rectified signal to said electron discharge device, a wave-shaping means coupled to the output of said integrating means, a plurality of oppositely poled unilateral conducting devices, means for applying different biases to one electrode of each said unilateral conducting device, and means for coupling said integrated signal to said plurality of unilateral conducting devices.

10. A device for developing a plurality of alternating electrical signals having similar electrical qualities and a constant phase relationship comprising a source of reference signals, multi-vibrator means coupled said source for developing square-wave alternating signals, means for integrating said square-wave alternating signals a conductor coupling said multi-vibrator means to said integrating means, a conducting path coupling two points of different potential, an electron discharge device disposed in said conducting path, a pair of oppositely poled unilateral conducting devices, one electrode of each unilateral conducting device connected to said conductor and the other electrode of each unilateral conducting device connected to said conducting path on opposite sides of said electron discharge device, means for amplifying and rectifying a portion of the integrated square-wave alternating signal to develop an automatic gain control signal, means for coupling said gain control signal to said electron discharge device to determine the conduction thereof and thereby the potentials in said conducting path on either side thereof whereby said oppositely poled unilateral conducting device will establish an amplitude level for said square-wave alternating signals, a wave-shaping means comprising a first voltage divider network connected to a point of positive potential and ground, a plurality of diodes having their cathodes connected at points of different potential in said network and then anodes coupled to the output of said integrating means, a second voltage divider network connected between a point of negative potential and ground, a plurality of diodes having their anodes connected at points of different potential in said network and their cathodes coupled to the output of said integrating means, a phase-shifting means receiving a portion of the output of said wave-shaping means, means for amplifying the output of said wave-shaping means and said phase-shifting means and means for deriving at least two outputs from said amplifying means.

11. In a programming control system in which a reference control pattern is stored on a data storage medium, means for deriving reference electrical signals from said reference control, means for developing square-wave alternating signals from said reference signals, means for integrating said square-wave alternating signals, means including a plurality of unilateral conducting devices providing paths to ground for successive portions of said integrated square-wave alternating signal for forming substantially sinusoidal alternating signals from said integrated square-wave signals, a first amplifying device, means coupling the output of said wave-forming means to said first amplifying device, phase shifting means including a variable gain amplifying tube, means coupling a portion of the output of said wave-forming means to said phase-shifting means, a second amplifying device, means coupling the output of said phase-shifting means to said second amplifying device, a reference potentiometer, a first rectifier poled in a first direction and coupled between the output of said first amplifying device and one end of said reference potentiometer, a second rectifier in a second direction and coupled between said second amplifying device and the other end of said reference potentiometer, a movable tap on said potentiometer, means coupling said tap to a control grid of said variable gain amplifying tube whereby a unidirectional voltage having a polarity and magnitude indicative of the relative outputs of said first and second amplifying devices will determine the gain of said phase-shifting means.

12. In a programming control system as defined in claim 5 including a frequency discriminator for developing control signals proportional to the frequency of said reference signals and means coupling the output of said frequency discriminator to said means for controlling the amplitude of said square-wave alternating signals.

13. In a programming control system in which a reference control pattern is stored on a data storage medium, means for deriving reference electrical signals from said reference control pattern, means for developing square-wave alternating signals from said reference signals, means including amplitude control means for integrating said square-wave alternating signals, means including a plurality of unilateral conducting devices providing paths to ground for successive portions of said integrated square-wave alternating signal for forming substantially sinusoidal alternating signals from said integrated square-wave signals, a first amplifying device, means coupling the output of said wave-forming means to said first amplifying device, phase-shifting means including a variable gain amplifying tube, means coupling a portion of the output of said wave-forming means to said phase-shifting means, a second amplifying device, means coupling the output of said phase-shifting means to said second amplifying device, and means responsive to variations in the frequency of said reference electrical signals for developing a control signal and means coupling said control signal to said integrating means and said phase-shifting means.

References Cited in the file of this patent
UNITED STATES PATENTS

| | | |
|---|---|---|
| 2,692,306 | Hathaway | Oct. 19, 1954 |
| 2,786,149 | Patton | Mar. 19, 1957 |
| 2,786,902 | Walter | Mar. 26, 1957 |
| 2,794,927 | Indjoudjian | June 4, 1957 |